US012691455B2

(12) United States Patent
Hanamura

(10) Patent No.: US 12,691,455 B2
(45) Date of Patent: Jul. 28, 2026

(54) PURIFICATION APPARATUS AND PURIFICATION METHOD

(71) Applicant: SEIKO EPSON CORPORATION, Tokyo (JP)

(72) Inventor: Masato Hanamura, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 668 days.

(21) Appl. No.: 17/657,085

(22) Filed: Mar. 29, 2022

(65) Prior Publication Data

US 2022/0314234 A1 Oct. 6, 2022

(30) Foreign Application Priority Data

Mar. 30, 2021 (JP) ................................ 2021-056844

(51) Int. Cl.
*B03C 1/28* (2006.01)
*B03C 1/12* (2006.01)

(52) U.S. Cl.
CPC ................ *B03C 1/288* (2013.01); *B03C 1/12* (2013.01); *B03C 2201/18* (2013.01); *B03C 2201/26* (2013.01)

(58) Field of Classification Search
CPC ....... B03C 1/288; B03C 1/12; B03C 2201/18; B03C 2201/26; B03C 1/005; B03C 1/0332; B03C 1/0335; B03C 1/30; B03C 1/00
See application file for complete search history.

(56) References Cited

U.S. PATENT DOCUMENTS

| | | | | |
|---|---|---|---|---|
| 4,390,283 | A * | 6/1983 | Meyer | B01F 29/80 366/225 |
| 2003/0059823 | A1 | 3/2003 | Matsunaga et al. | |
| 2006/0081539 | A1 * | 4/2006 | Safar | B01L 3/5082 210/695 |
| 2009/0064800 | A1 | 3/2009 | Fasching et al. | |
| 2017/0283791 | A1 | 10/2017 | Fukushima et al. | |
| 2017/0292966 | A1 * | 10/2017 | Yu | G01N 35/025 |

FOREIGN PATENT DOCUMENTS

| | | | |
|---|---|---|---|
| JP | 2000093834 | A | 4/2000 |
| JP | 2003164279 | A | 6/2003 |
| JP | 2005205367 | A | 8/2005 |

(Continued)

OTHER PUBLICATIONS

Office Action for JP Patent Application No. 2021056844, issued on Feb. 4, 2025, 8 pages.

(Continued)

*Primary Examiner* — Waqaas Ali
(74) *Attorney, Agent, or Firm* — CHIP LAW GROUP

(57) ABSTRACT

A purification apparatus includes a holding unit including a bottom plate for supporting a bottom portion of a container to be mounted, and a magnetic unit arranged on the bottom plate or below the bottom plate so as to face the bottom portion of the container. The magnetic unit fixes magnetic particles of an amorphous metal to an inner bottom portion or an inner wall of the container so as to separate a liquid in the container and the magnetic particles contained in the liquid from each other and/or to collect the liquid while leaving the magnetic particles in the container.

7 Claims, 9 Drawing Sheets

(56) References Cited

FOREIGN PATENT DOCUMENTS

| | | | | |
|---|---|---|---|---|
| JP | 2005523692 | A | | 8/2005 |
| JP | 4089210 | B2 | * | 5/2008 |
| JP | 4214253 | B2 | | 1/2009 |
| JP | 2009066476 | A | | 4/2009 |
| JP | 2009072774 | A | | 4/2009 |
| JP | 2014018692 | A | * | 2/2014 |
| JP | 5974230 | B2 | | 8/2016 |
| JP | 2017176023 | A | | 10/2017 |
| JP | 6597451 | B2 | | 10/2019 |
| WO | 03090897 | A1 | | 11/2003 |

OTHER PUBLICATIONS

Office Action for CN Patent Application No. 202210310415.3, issued on Mar. 21, 2025, 28 pages.

* cited by examiner

PURIFICATION APPARATUS AND PURIFICATION METHOD

The present application is based on, and claims priority from JP Application Serial Number 2021-056844, filed Mar. 30, 2021, the disclosure of which is hereby incorporated by reference herein in its entirety.

BACKGROUND

1. Technical Field

The present disclosure relates to a purification apparatus and a purification method.

2. Related Art

In recent years, a magnetic separation method (B/F separation) using fine magnetic beads has been widely used as a method for purifying biological substances in diagnosis and various tests in the medical field and the biotechnology field. For example, biological substances are extracted and purified by the magnetic separation method in a nucleic acid extraction step which is a previous step of a PCR test, a cell extraction step which is a previous step of an antibody test, and the like.

A PCR method is a method used in a nucleic acid detection step. The PCR method is a method of extracting a nucleic acid in a pretreatment and specifically amplifying and detecting the nucleic acid. To efficiently extract the nucleic acid, a method of extracting the nucleic acid by applying a magnetic field using magnetic beads having a function of supporting the nucleic acid is used in a pretreatment step of the PCR method in recent years. Specifically, the nucleic acid is extracted by repeating ON/OFF of the magnetic field application a plurality of times. Further, the same method is used in a cell extraction step for proteins, cancer cells, and the like.

To separate, from a solution, magnetic beads with biological substances adsorbed thereto, a magnetic stand that can hold a container such as a microtube and includes a magnet is used.

For example, JP-A-2000-93834 discloses a magnetic stand that separates magnetic fine particles suspended in a liquid in a microtube by using a permanent magnet arranged in parallel to a groove in a back plate of the stand.

Further, JP-A-2014-18692 discloses a magnetic stand that collects magnetic particles by bringing a magnetic unit into close contact with a tapered portion of a container from a side surface side of the container.

In recent years, from the viewpoint of shortening an inspection time, highly magnetized magnetic beads with fast collection capability have been studied. However, in a magnetic stand in the related art as described in JP-A-2000-93834 and JP-A-2014-18692, when highly magnetized magnetic beads are used, aggregates of the magnetic beads have a needle-like structure extending in a direction (a horizontal direction in JP-A-2000-93834 and JP-A-2014-18692) along a magnetic field line after a magnetic field is applied.

In a purification step, when the aggregates of the magnetic beads have a needle-like structure extending in the horizontal direction, the magnetic beads may also be suctioned together with a purification liquid (for example, a cleaning liquid) in the container in the case of suctioning and collecting the purification liquid by a suction device or the like. Thus, the magnetic beads are removed from the liquid, and as a result, extraction efficiency and purification efficiency for a substance to be purified may be lowered.

SUMMARY

A purification apparatus according to a first aspect of the present disclosure includes: a holding unit including a bottom plate for supporting support a bottom portion of a container to be mounted; and a magnetic unit arranged on the bottom plate or below the bottom plate so as to face the bottom portion of the container. The magnetic unit fixes magnetic particles of an amorphous metal to an inner bottom portion or an inner wall of the container so as to separate a liquid in the container and the magnetic particles contained in the liquid from each other and/or to collect the liquid while leaving the magnetic particles in the container.

A purification apparatus according to a second aspect of the present disclosure includes: a holding unit including a support portion for supporting a body portion of a container to be mounted and a back plate; and a magnetic unit provided on the back plate or on a side of the back plate. The holding unit and the magnetic unit are relatively movable along a longitudinal direction of the container. The magnetic unit has an arrangement position variable with respect to the container. By relatively moving the magnetic unit and the container, a liquid in the container and magnetic particles of an amorphous metal contained in the liquid are separated from each other and/or the magnetic particles are collected to the outside of the liquid.

A purification apparatus according to a third aspect of the present disclosure includes: a holding unit including a support portion having a pair of support members for supporting a body portion of a container to be mounted from both side surfaces; and a pair of magnetic units respectively provided on the pair of support members or between the support members and the container. The pair of magnetic units are arranged such that the same polarities face each other with the container to be mounted sandwiched therebetween. The holding unit and the magnetic units are relatively movable along a longitudinal direction of the container. By relatively moving the magnetic units and the container, a liquid in the container and magnetic particles of an amorphous metal contained in the liquid are separated from each other and/or the magnetic particles are collected to the outside of the liquid.

A purification method according to an aspect of the present disclosure is a purification method using the first purification apparatus. The method includes: a mounting step of supporting, by the bottom plate, the bottom portion of the container in which a test liquid containing the liquid and the magnetic particles of an amorphous metal is contained, and mounting the container on the holding unit in a state in which the container is standing; a separation step of separating the liquid and the magnetic particles from each other and/or fixing the magnetic particles to the inner bottom portion or the inner wall of the container by driving the magnetic unit arranged on the bottom plate to generate a magnetic force in a vertical direction; and a collection step of suctioning the liquid with the magnetic force generated and collecting the liquid from the container. In the separation step, when the magnetic force is generated, a magnetic field gradient is applied such that $F_{mag}$ obtained by the following equation (1) is 500 pN or more.

$$F_{mag} = M(B) \times G \times m \tag{1}$$

Here, in the equation (1), $F_{mag}$ represents a force [pN] generated in the magnetic particles, M(B) represents saturation magnetization [$Am^2/kg$], G represents the magnetic field gradient [T/m], and m represents a weight [kg] of the magnetic particles.

A purification method according to a second aspect of the present disclosure is a purification method using the second purification apparatus. The method includes: a mounting step of supporting, by the support portion, the body portion of the container in which a test liquid containing the liquid and the magnetic particles of an amorphous metal is contained, and mounting the container on the holding unit in a state in which the container is standing; and a separation step of separating the liquid and the magnetic particles from each other and/or collecting the magnetic particles by driving the magnetic unit to generate a magnetic force in a horizontal direction and relatively moving (vertically moving) the holding unit and the magnetic unit along a longitudinal direction of the container. In the separation step, when the magnetic force is generated, a magnetic field gradient is applied such that $F_{mag}$ obtained by the following equation (2) is 15 pN or more.

$$F_{mag} = M(B) \times G \times m \tag{2}$$

Here, in the equation (2), $F_{mag}$ represents a force [pN] generated in the magnetic particles, M(B) represents saturation magnetization [$Am^2/kg$], G represents the magnetic field gradient [T/m], and m represents a weight [kg] of the magnetic particles.

A purification method according to a third aspect of the present disclosure is a purification method using the third purification apparatus. The method includes: a magnetic force generation step of generating a magnetic force in a horizontal direction by driving the pair of magnetic units; and a separation step of mounting, on the holding unit, the container, in which a test liquid containing the liquid and the magnetic particles of an amorphous metal is contained and which is in a standing state, by relatively moving (vertically moving) the container and the magnetic units along a longitudinal direction of the container, and separating the liquid and the magnetic particles from each other and/or collecting the magnetic particles. In the separation step, when the magnetic force is generated, a magnetic field gradient is applied such that $F_{mag}$ obtained by the following equation (3) is 15 pN or more.

$$F_{mag} = M(B) \times G \times m \tag{3}$$

Here, in the equation (3), $F_{mag}$ represents a force [pN] generated in the magnetic particles, M(B) represents saturation magnetization [$Am^2/kg$], G represents the magnetic field gradient [T/m], and m represents a weight [kg] of the magnetic particles.

DESCRIPTION OF EXEMPLARY EMBODIMENTS

First Embodiment

Hereinafter, a purification apparatus according to a first embodiment of the present disclosure will be described.

Figure 1:
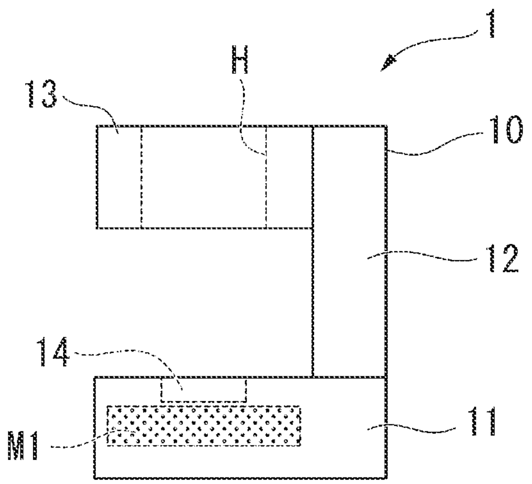
FIG. 1 is a schematic side view showing a purification apparatus according to a first embodiment.
Figure 2:
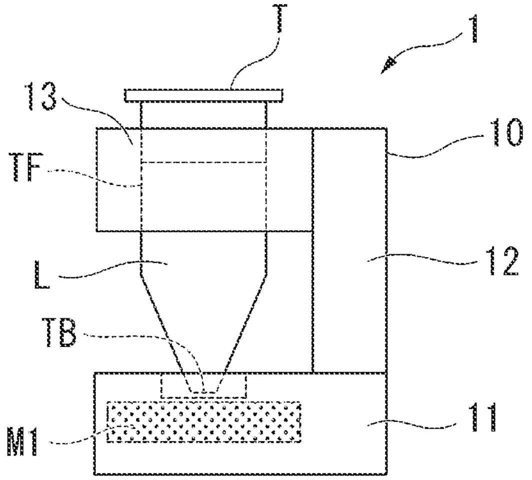
FIG. 2 is a schematic side view showing a state in which a container is mounted on the purification apparatus in FIG. 1.
Figure 3:
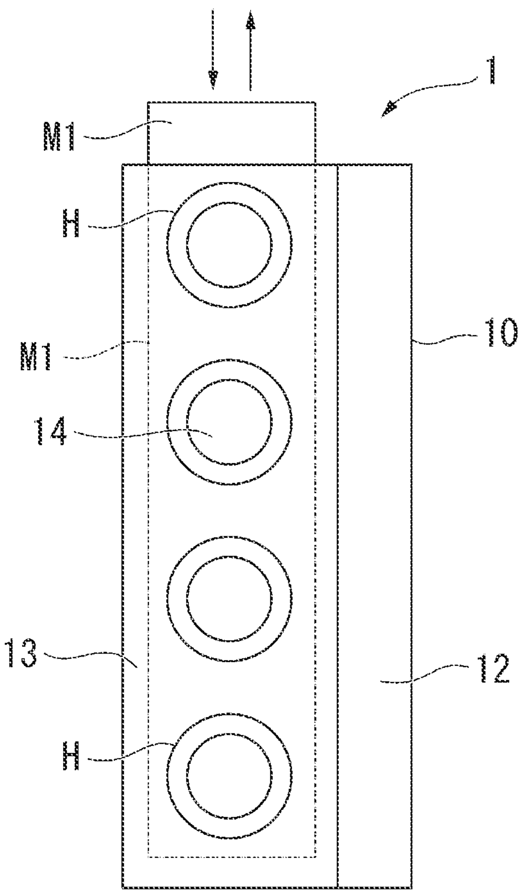
FIG. 3 is a schematic top view showing the purification apparatus according to the first embodiment.

FIG. 1 is a schematic side view showing the purification apparatus according to the first embodiment. FIG. 2 is a schematic side view showing a state in which a container is mounted on the purification apparatus in FIG. 1. FIG. 3 is a schematic top view of the purification apparatus according to the first embodiment. In the purification apparatus shown in FIG. 3, for convenience of explanation, a configuration in which a plurality of holding units 10 are arranged in a row and are integrated is adopted. However, the configuration of the purification apparatus according to the present embodiment is not limited thereto, and of course, the purification apparatus may be configured by only one holding unit 10.

In the following drawings, the scale of dimensions may be different depending on components to make it easier to see each component.

The purification apparatus according to the present embodiment is an apparatus that purifies, using a magnetic separation method, a target substance from a suspension filled in a container. Specifically, as shown in FIGS. 1 and 2, a purification apparatus 1 includes the holding unit 10 for holding a container T, and a magnetic unit M1 arranged in the holding unit 10. The purification apparatus 1 according to the present embodiment purifies a target substance from a suspension L filled in a container by a magnetic force of the magnetic unit M1.

The holding unit 10 includes a bottom plate 11 for supporting a bottom portion of a container to be mounted, a back plate 12 vertically erected from the bottom plate 11, and a support portion 13 provided on an upper portion of the back plate 12 to extend in a horizontal direction. With such a configuration, the container T is held as shown in FIG. 2.

A fixing recess 14 for fixing a bottom portion TB of the container T may be provided on an upper surface of the bottom plate 11. By providing the fixing recess 14, the container T can be fixed more stably.

The shape of the fixing recess 14 does not necessarily have to match the shape of the bottom portion TB of the container T, and may be a concave shape slightly larger than the shape of the bottom portion TB. That is, the fixing recess 14 further enhances attitude stability of the container T to be mounted, and the shape and size of the fixing recess 14 may be appropriately determined such that wobbling of the container T can be prevented. When the container T can be sufficiently supported or fixed by the support portion 13 to be described later, the fixing recess 14 may not be provided. In this case, the bottom portion TB of the container T is directly supported on the upper surface of the bottom plate 11.

The support portion 13 is a plate-shaped member, and is provided with a holding hole H penetrating a plate in a vertical direction. The container T is inserted from the holding hole H and a body portion TF of the container T is supported, and the container T is mounted on the holding unit 10. In the present embodiment, a mechanism that supports the body portion TF of the container T is not limited to the support portion 13, and may be, for example, a mechanism that holds and supports both side surfaces of a container by a plurality of (for example, a pair of) support portions.

The container T to be mounted on the holding unit 10 is not particularly limited, and may be selected from the group consisting of a microtube, a test tube, and a centrifuge tube.

As shown in FIG. 1, the bottom plate 11 is provided with the magnetic unit M1 so as to face the bottom portion TB of the container T to be mounted. FIG. 1 shows an example in which the magnetic unit M1 is provided inside the bottom plate 11, or the magnetic unit M1 may be provided below the bottom plate 11. That is, the magnetic unit M1 may be provided inside or outside the bottom plate 11 as long as the magnetic unit M1 is provided so as to face the bottom portion TB of the container T.

The purification apparatus 1 according to the present embodiment is an apparatus that purifies a target substance or a target component from a liquid (suspension) in a container by a magnetic separation method using a magnetic powder as a carrier. That is, the magnetic unit M1 separates magnetic particles of an amorphous metal in the container T and/or fixes the magnetic particles to a bottom surface (inner bottom portion) or a side surface (inner wall) of the container T. Accordingly, the liquid can be collected while leaving the magnetic particles in the container T, and the target substance or the target component can be purified from the liquid (suspension) in the container T.

The magnetic unit M1 is not particularly limited as long as it can generate a magnetic force, and is preferably a permanent magnet or an electromagnet. Examples thereof include rare earth magnets such as a neodymium magnet and a cobalt magnet. The magnetic unit M1 may be a magnet magnetized with multiple poles. By using a magnet magnetized with multiple poles as the magnetic unit M1, a large magnetic field gradient can be generated in the container T.

The magnetic unit M1 may be detachably provided with respect to the holding unit 10. For example, as shown in FIG. 3, an insertion opening (not shown) may be provided in a side surface of the bottom plate 11 of the holding unit 10, and the magnetic unit M1 may be inserted into the insertion opening when performing magnetic separation. In other steps, the magnetic unit M1 may be taken out (see arrows in FIG. 3). Further, the insertion opening may be provided in a front surface of the bottom plate 11, and the magnetic unit M1 may be mounted and detached from a front side of the holding unit 10.

The magnetic unit M1 may be embedded in the bottom plate 11 of the holding unit 10 or may be exposed from the upper surface of the bottom plate 11. That is, the magnetic unit M1 may be provided so as to be in contact or not in contact with the bottom portion TB of the container T to be mounted. Further, when the bottom plate 11 is provided with the fixing recess 14, the magnetic unit M1 may be embedded below the fixing recess 14 or may be provided so as to be exposed from the fixing recess 14.

The magnetic unit M1 is preferably provided such that a direction of a magnetic field line is a longitudinal direction of the container T, that is, a vertical direction.

Since the magnetic powder filled in the container T is an amorphous metal having strong magnetization, the magnetic powder exhibits a needle-like structure along the magnetic field line when a magnetic field is applied. In the present embodiment, by arranging the magnetic unit M1 such that the direction of the magnetic field line is the vertical direction, the needle-like structure can face upward, and therefore, an amount of liquid held by aggregates of the magnetic powder can be minimized.

Figure 4A:
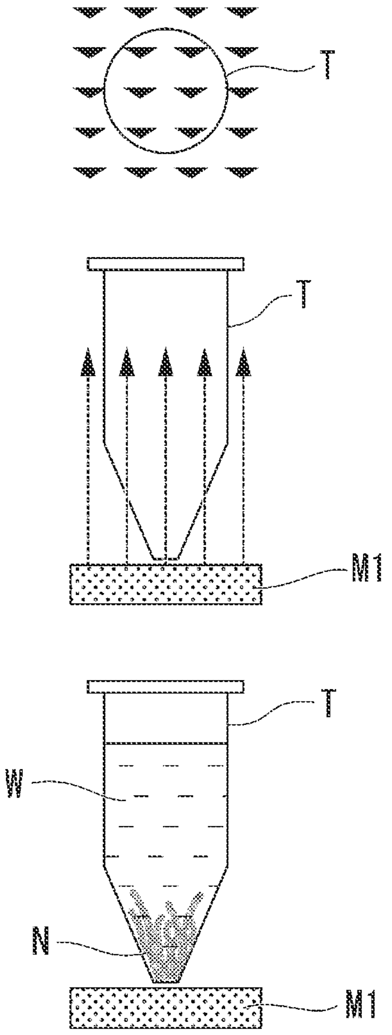
FIG. 4A is a schematic view showing a direction pattern of a magnetic field line in the first embodiment.
Figure 4B:
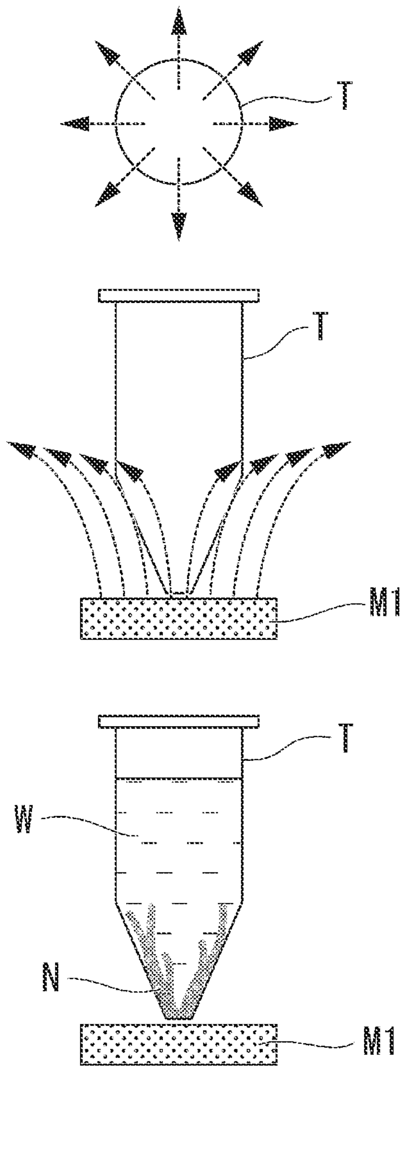
FIG. 4B is a schematic view showing a direction pattern of the magnetic field line in the first embodiment.
Figure 4C:
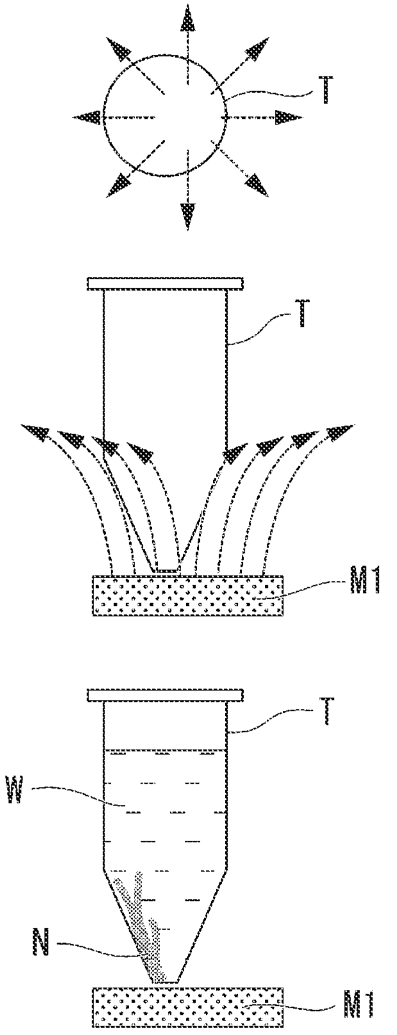
FIG. 4C is a schematic view showing a direction pattern of the magnetic field line in the first embodiment.

FIGS. 4A to 4C are schematic views showing direction patterns of a magnetic field line generated in the purification apparatus 1. In each of FIGS. 4A to 4C, an upper part is a schematic view of the container T as viewed from above, and a middle part and a lower part are views of the container T as viewed from the side. All arrows in the drawings indicate the directions of the magnetic field line. Further, the lower part of each of FIGS. 4A to 4C shows an aggregation pattern of a magnetic powder N.

As shown in FIGS. 4A to 4C, the direction of the magnetic field line generated in the container T varies depending on performance and an arrangement location of the magnetic unit M1, and various directions can be considered in the present embodiment. However, in any case, the magnetic field line is preferably oriented in the vertical direction.

For example, in FIG. 4A, the magnetic unit M1 is arranged such that the magnetic field line is generated in the vertical direction. Therefore, the magnetic powder N rises in a needle-like shape and has a needle-like structure extending in the vertical direction from the bottom surface of the container. In order to collect a sufficient amount of liquid and reduce a residual liquid in the container T in such a state, it is necessary to insert a tip of a liquid suction jig (micropipette or the like) into aggregates of the magnetic powder N and make the tip reach the bottom surface of the container T and then suction the liquid.

Since a magnetic powder in the related art such as ferrite has weak magnetization, the magnetic powder may also be suctioned in addition to the liquid when the above-mentioned operation is performed. In contrast, when a magnetic powder made of an amorphous metal having strong magnetization is used as in the present embodiment, the magnetic powder can be strongly adsorbed by the magnetic unit M1, and therefore, the magnetic powder N is not suctioned into the tip and remains in the container T even when the above-mentioned operation is performed. Accordingly, a remaining amount of a liquid W after suction can be reduced.

FIG. 4B shows an example in which the magnetic unit M1 is arranged such that the magnetic field line spreads radially outward from a center of the bottom portion of the container. In this example, since the magnetic field line spreads radially, the magnetic powder N aggregates along the side surface from the bottom surface of the container T, but does not aggregate at a central portion of the container T. Therefore, the tip can be inserted to the bottom surface of the container without being in contact with the magnetic powder N. Further, since the liquid can be suctioned while avoiding suctioning the magnetic powder N, erroneous suction of the magnetic powder N can be prevented, and the remaining amount of the liquid W can be greatly reduced. A pattern of the magnetic field line as shown in FIG. 4B is desirable when a biological substance (for example, a cell) having weak physical contact is adsorbed on a surface of the magnetic powder.

FIG. 4C shows an example in which the magnetic unit M1 is arranged such that a starting point of the magnetic field line (a start point where the magnetic field line spreads radially) is slightly shifted from the center of the container T. As described above, only a position where the magnetic powder N aggregates is biased even when the starting point of the magnetic field line extending radially is shifted from the center of the container, and the same operation and effect as those in the case of FIG. 4B can be obtained.

The direction, density, and the like of the magnetic field line can be controlled by adjusting a shape, performance, and the like of the magnetic unit M1 to be used.

In the purification apparatus 1 according to the present embodiment, a vibration generator for mixing and stirring the liquid and the magnetic particles in the container T may be provided below the holding unit 10.

Figure 5:
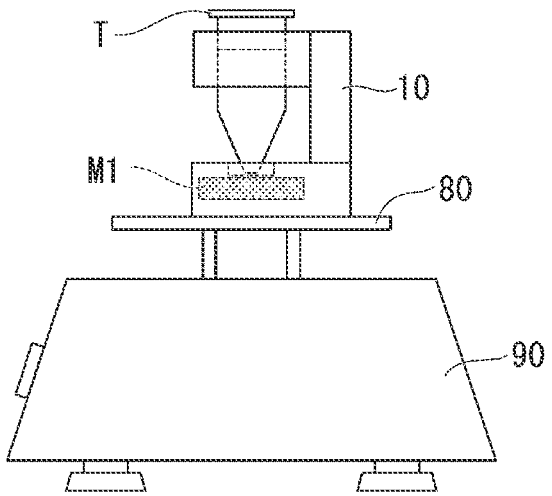
FIG. 5 is a diagram showing an example in which a vibration generator is provided in the purification apparatus according to the first embodiment.

FIG. 5 shows an example in which a vibration generator 90 is provided below the holding unit 10. The holding unit 10 and the vibration generator 90 may be fixed to each other by the magnetic force of the magnetic unit M1 via a holding unit fixing portion 80, for example. The holding unit 10 and the vibration generator 90 can be easily mounted and detached by being fixed to each other by the magnetic force. When the holding unit 10 and the vibration generator 90 are fixed to each other by the magnetic force of the magnetic unit M1, the holding unit fixing portion 80 is preferably made of a material that strongly attracts magnets, such as iron. The holding unit fixing portion 80 may be a permanent magnet.

Further, when the vibration generator 90 performs stirring, the magnetic unit M1 is preferably removed from the holding unit 10. In this way, the magnetic powder in the container T can be efficiently dispersed. The type of the vibration generator 90 is not particularly limited as long as the vibration generator 90 can mix and stir the liquid and the magnetic particles by vibration. For example, a vortex mixer that performs stirring by rotating the bottom portion of the container at a high speed may be used.

The purification apparatus according to the first embodiment has been described above. The use of the purification apparatus according to the first embodiment is not particularly limited, and the purification apparatus can be used as an apparatus for purifying and separating nucleic acids, antibodies, extracellular vesicles, cells, proteins, peptides, bacteria, viruses, algae, low molecular weight compounds, heavy metals, and the like. In particular, a magnetic stand that uses a magnetic powder as a carrier to separate biological components such as nucleic acids, proteins, and cells from liquids and further purify the biological components can be preferably used.

Next, a purification method using the purification apparatus 1 according to the first embodiment will be described in detail.

The purification method according to the present embodiment includes: a mounting step of supporting, by the bottom plate 11, the bottom portion TB of the container T in which the test liquid L (suspension) containing the liquid W and the magnetic particles N of an amorphous metal is contained, and mounting the container T on the holding unit 10 in a state in which the container T is standing; a separation step of separating the liquid W and the magnetic particles N from each other and/or fixing the magnetic particles N to the inner bottom portion or the inner wall of the container T by driving the magnetic unit M1 arranged on the bottom plate 11 to generate a magnetic force in the vertical direction; and a collection step of suctioning the liquid W with the magnetic force generated and collecting the liquid W from the container T.

In the mounting step, first, the container T, in which the test liquid L containing the liquid W and the magnetic particles N of an amorphous metal is contained, is prepared, and then, as shown in FIG. 2, the container T is mounted on the holding unit 10.

The magnetic particles N to be used are composed of an amorphous metal. A coating layer such as a silicon oxide film may be formed on a surface of the magnetic particles N.

The amorphous metal is not particularly limited, and examples thereof include various Fe-based amorphous alloys such as a Fe—Si—B-based amorphous alloy, a Fe—Si—B—C-based amorphous alloy, a Fe—Si—B—Cr-based amorphous alloy, a Fe—Si—B—Cr—C-based amorphous alloy, a Fe—Co—Si—B-based amorphous alloy, and a Fe—Si—B—Nb-based amorphous alloy.

Among these amorphous alloys, the Fe—Si—B—Cr-based amorphous alloy is preferably used in particular. The Fe—Si—B—Cr-based amorphous alloy can have a sufficiently low coercive force. The Fe—Si—B—Cr-based amorphous alloy is an amorphous alloy containing Fe as a main component and containing, in mass %, 2% or more and 9% or less of Si, 1% or more and 5% or less of B, and 1% or more and 3% or less of Cr. Among elements constituting the Fe—Si—B—Cr-based amorphous alloy, Fe (iron) is the main component having the highest content. Therefore, Fe has a great influence on basic magnetic properties and mechanical properties of the magnetic powder. Further, Fe contributes to increasing a maximum magnetic moment per unit mass of the amorphous alloy.

Si (silicon) contributes to increasing a magnetic permeability of the amorphous alloy. Further, by adding a certain amount of Si, the coercive force can also be reduced. Therefore, the content of Si is preferably 2 mass % or more and 9 mass % or less.

B (boron) lowers a melting point of the amorphous alloy and facilitates amorphization. B also contributes to reducing the coercive force. Therefore, the content of B in the amorphous alloy is preferably 1 mass % or more and 5 mass % or less.

Cr (chromium) acts to improve corrosion resistance of the amorphous alloy. That is, when a passive film mainly containing an oxide of Cr ($Cr_2O_3$ or the like) is formed on the surface of the particles, the corrosion resistance of the particles is improved. Since oxidation of Fe over time is prevented by the improvement of the corrosion resistance, it is possible to prevent deterioration of the magnetic properties due to the oxidation of Fe, for example, a decrease in saturation magnetic flux density. Therefore, the content of Cr in the amorphous alloy is preferably 1 mass % or more and 3 mass % or less.

Saturation magnetization of the magnetic particles N is preferably 50 $Am^2/kg$ or more. The larger the saturation magnetization of the magnetic particles N, the more the function as a magnetic material can be fully exerted, and the more a moving speed (collecting speed) of particles in the magnetic field can be improved. Accordingly, a purification time can be shortened. To obtain such an effect, the saturation magnetization of the magnetic particles N is preferably 50 $Am^2/kg$ or more, and more preferably 100 $Am^2/kg$ or more.

The saturation magnetization of the magnetic particles N can be measured by a vibrating sample magnetometer (VSM). Specifically, the saturation magnetization can be measured by "TM-VSM1230-MHHL" manufactured by Tamakawa Co., Ltd., or the like.

In the present embodiment, the test liquid L containing the magnetic particles N and the liquid W as described above is filled in the container T and then sufficiently stirred, and the container T is mounted on the holding unit 10. The liquid W contains a substance to be purified. Examples of substances or components that can be purified by the purification method according to the present embodiment include biological substance components such as nucleic acids, antibodies, proteins, extracellular vesicles, and cells, and algae, bacteria, and viruses. An extraction liquid for extracting the substance to be purified, a cleaning liquid for removing substances not to be purified, and the like may be appropriately added to the test liquid L.

After the mounting step, the separation step of separating the liquid W and the magnetic particles N from each other is performed. Specifically, as shown in FIG. 2, when the container T is mounted, the magnetic unit M1 arranged on the bottom plate 11 is driven to generate a magnetic force in the vertical direction. By such magnetic separation, the liquid W and the magnetic particles N are separated from each other, and/or the magnetic particles N are fixed to the inner bottom portion (bottom surface) or the inner wall of the container T. When a permanent magnet is used as the magnetic unit M1, there is no need to supply a magnetic field or a current from the outside, and therefore, at a time when the container T is mounted on the holding unit 10, a magnetic force is generated and separation of the liquid W and the magnetic particles N starts.

In the separation step of the present embodiment, when a magnetic force is generated, a magnetic field gradient is applied such that a force $F_{mag}$ generated in the magnetic particles N, which is obtained by the following equation (1) (Reference Literature: European Patent No. 2086687), is 500 pN or more. In the subsequent collection step, suction is performed using a suction jig such as a micropipette to collect the liquid W from the container T. Therefore, it is necessary that the magnetic particles N aggregated from the inner bottom portion to the inner wall of the container T are subjected to a magnetic force sufficient to withstand the suction. The force generated in the magnetic particles N is obtained based on the saturation magnetization and a weight of the magnetic particles N and the applied magnetic field gradient. In the present embodiment, the magnetic field gradient is applied such that $F_{mag}$ is 50 pN or more according to a type (that is, saturation magnetization) and a dimension (that is, weight) of the magnetic particles to be used. Accordingly, the magnetic powder N is not suctioned into the tip together with the liquid W, and the liquid W can be sufficiently removed.

$$F_{mag} = M(B) \times G \times m \tag{1}$$

Here, in the equation (1), $F_{mag}$ represents the force [pN] generated in the magnetic particle, M(B) represents the saturation magnetization [$Am^2/kg$], G represents the magnetic field gradient [T/m], and m represents the weight [kg] of the magnetic particles.

After the separation step, the liquid W is suctioned using a suction jig such as a micropipette with the magnetic force generated, and the liquid W is collected from the container T.

By the above-mentioned steps, the magnetic powder N can be separated from the test liquid L filled in the container T.

When the separation step is repeated a plurality of times, a new liquid (cleaning liquid or the like) is added and the magnetic powder N is dispersed again after the liquid W is collected from the container T. At this time, if the container T, the holding unit 10, and the vibration generator 90 are coupled to each other, the magnetic powder N can be dispersed again simply by removing the magnetic unit M1 and driving the vibration generator 90. Then, the magnetic powder N can be collected again simply by attaching the magnetic unit M1. Therefore, in the related art, it is necessary to detach the container from the holding unit and detach the container from the vibration generator when re-dispersing the magnetic powder. However, in the present embodiment, the purification time can be shortened since the magnetic powder can be re-dispersed simply by detaching the magnetic unit M1.

With the purification apparatus and the purification method according to the present embodiment described above, the magnetic unit M1 is arranged at a position facing the bottom portion of the container T, and therefore, the magnetic powder N having high magnetization exhibits a needle-like structure extending in the vertical direction (upward). Further, even when a suction operation of inserting the tip into the aggregated magnetic powder N is performed, the magnetic powder N is not suctioned into the tip together with the liquid W and the liquid W can be sufficiently collected since the magnetic powder N has strong magnetization. Therefore, the amount of the liquid W held by the magnetic powder N can be greatly reduced, and the amount of the liquid W carried to the next step can be greatly reduced.

Second Embodiment

Hereinafter, a purification apparatus according to a second embodiment of the present disclosure will be described.

Figure 6:
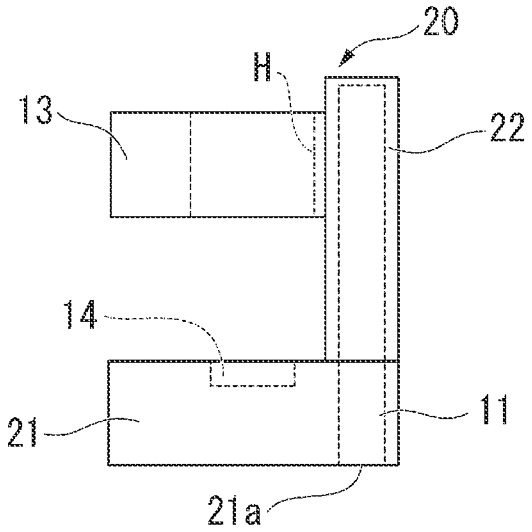
FIG. 6 is a schematic side view showing a holding unit of a purification apparatus according to a second embodiment.
Figure 7:
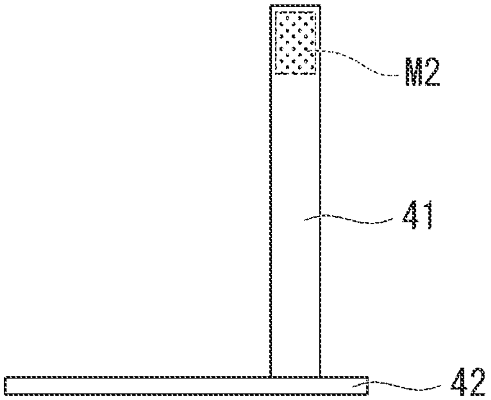
FIG. 7 is a schematic side view showing a magnetic unit of the purification apparatus according to the second embodiment.
Figure 8:
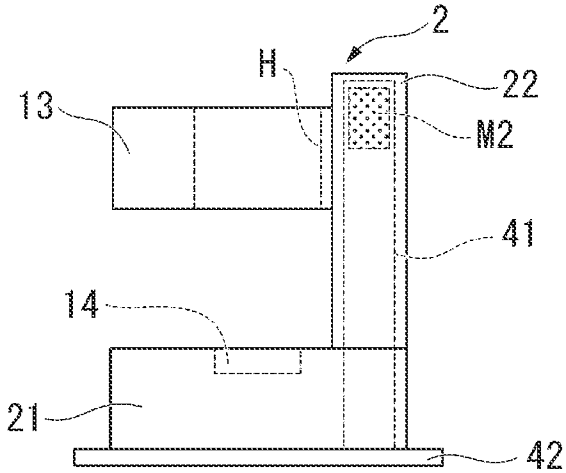
FIG. 8 is a schematic side view showing the purification apparatus according to the second embodiment.

FIG. 6 is a schematic side view showing a holding unit 20 of a purification apparatus 2 according to the second embodiment. FIG. 7 is a schematic side view showing a magnetic unit M2 of the purification apparatus 2 according to the second embodiment. FIG. 8 is a schematic side view showing the purification apparatus 2 according to the second embodiment.

In the following drawings, the scale of dimensions may be different depending on components to make it easier to see each component. In the drawings used in the present embodiment, the same components as those in the drawings used in the first embodiment are denoted by the same reference numerals, and the description thereof is omitted.

As in the first embodiment, the purification apparatus 2 according to the present embodiment is an apparatus that purifies, using the magnetic separation method, a target substance from a suspension filled in a container. Specifically, as shown in FIGS. 6 to 8, the purification apparatus 2 includes the holding unit 20 for holding the container T, and the magnetic unit M2 arranged in a back plate 22 of the holding unit 20.

The holding unit 20 includes a bottom plate 21 for supporting a bottom portion of a container to be mounted, the support portion 13 for supporting a body portion of the container to be mounted, and the back plate 22 vertically erected from the bottom plate 21. With such a configuration, the container T is held (see FIG. 9D). FIG. 6 shows an example of the hollow back plate 22 in which the magnetic unit M2 can be arranged, but the form of the back plate 22 is not limited thereto. That is, the magnetic unit M2 may be provided outside the back plate 22. For example, the magnetic unit M2 may be provided so as to be movable in the vertical direction on a side surface of the back plate 22 on a container T side (between the back plate 22 and the container T) or on a side surface of the back plate 22 facing the container T.

Hereinafter, an example of the hollow back plate 22 as shown in FIG. 6 will be described.

The bottom plate 21 of the holding unit 20 may be provided with the fixing recess 14 as in the first embodiment.

As in the first embodiment, the support portion 13 of the present embodiment is provided to extend in the horizontal direction from an upper portion of the back plate 22. Further, the holding hole H for inserting the container and holding the body portion of the container may be provided in the same manner as in the first embodiment.

In the present embodiment, arrangement of the magnetic unit M2 is different from that of the first embodiment.

As shown in FIG. 7, the magnetic unit M2 is provided integrally with an upper portion of a support rod 41 erected on a support base 42. As shown in FIG. 6, the magnetic unit M2 is arranged in the back plate 22 by being inserted into an insertion hole 21*a* provided in the bottom plate 21 together with the support rod 41. That is, the arrangement position of the magnetic unit M2 is variable with respect to the holding unit 20 (that is, the container to be mounted). In the above-mentioned description, it has been described that "the magnetic unit M2 . . . by being inserted into an insertion hole 21*a*", but the holding unit 20 may be inserted into the support rod 41. In either case, the same form (FIG. 9D) is obtained.

In the present embodiment, since the support rod 41 integrated with the magnetic unit M2 is inserted into the insertion hole 21*a* as described above, the holding unit 20 and the magnetic unit M2 can relatively move (vertically move) along the longitudinal direction of the container. Therefore, when performing actual purification, by mounting the container on the holding unit 20, inserting the magnetic unit M2 into the insertion hole 21*a*, and repeating the vertical movement, the magnetic powder can easily follow the movement of the magnetic unit.

As described above, in the present embodiment, by relatively moving the magnetic unit and the container mounted on the holding unit, the liquid in the container and the magnetic particles contained in the liquid are separated from each other and/or the magnetic particles are collected to the outside of the liquid. Accordingly, the target substance or the target component can be purified from the liquid (suspension) in the container.

As in the first embodiment, the magnetic unit M2 is preferably a permanent magnet or an electromagnet. Further, in the present embodiment, a vibration generator for mixing and stirring the liquid and the magnetic particles in the container may be provided below the holding unit 20.

As in the first embodiment, the purification apparatus 2 according to the present embodiment can be used as an apparatus for purifying and separating nucleic acids, antibodies, extracellular vesicles, cells, proteins, peptides, bacteria, viruses, algae, low molecular weight compounds, heavy metals, and the like. In particular, a magnetic stand that uses a magnetic powder as a carrier to separate biological components such as nucleic acids, proteins, and cells from liquids and further purify the biological components can be preferably used.

Next, a purification method using the purification apparatus 2 according to the second embodiment will be described in detail with reference to FIGS. 9A to 9D.

The purification method according to the present embodiment includes: a mounting step of supporting, by a support portion, a body portion of a container in which a test liquid containing a liquid and magnetic particles of an amorphous metal is contained, and mounting the container on a holding unit in a state in which the container is standing; and a separation step of separating the liquid and the magnetic particles from each other and/or collecting the magnetic particles by driving the magnetic unit to generate a magnetic force in a horizontal direction and relatively moving (vertically moving) the holding unit and the magnetic unit along a longitudinal direction of the container.

Figure 9A:
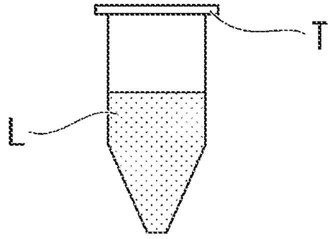
FIG. 9A is a diagram showing a purification method according to the second embodiment.
Figure 9B:
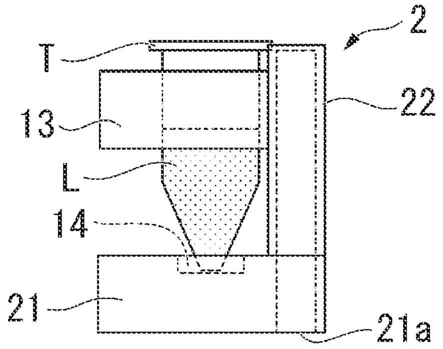
FIG. 9B is a diagram showing the purification method according to the second embodiment.

As in the first embodiment, in the mounting step, first, the container, in which the test liquid (suspension) L containing a liquid and magnetic particles of an amorphous metal is contained (FIG. 9A), is prepared, and then, the container is mounted on the holding unit 20 (FIG. 9B). The type and performance (magnetic properties and the like) of the magnetic particles to be used may be the same as those in the first embodiment. The mounting step may not be necessarily required when a cleaning step is performed a plurality of times. This is because the magnetic particles N can be freely dispersed by removing the magnetic unit M2 from the insertion hole 21*a* without mounting the container T on the holding unit 20, and thus cleaning and an adsorption step for the substance to be purified can be efficiently performed.

After the mounting step, the separation step of separating the liquid and the magnetic particles from each other is performed.

Figure 9C:
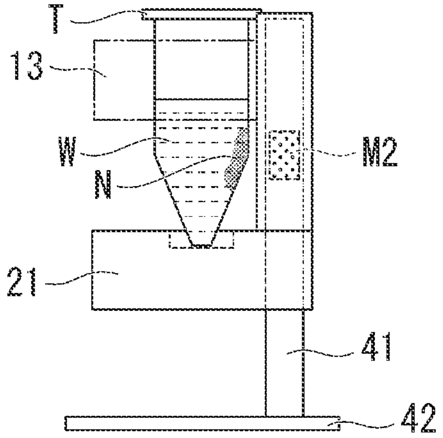
FIG. 9C is a diagram showing the purification method according to the second embodiment.

Specifically, as shown in FIG. 9C, the support rod 41 attached with the magnetic unit M2 is inserted from below the insertion hole 21*a*. At this time, the support rod 41 is inserted in a state in which the magnetic unit M2 is driven to generate a magnetic force in the horizontal direction. Thus, the magnetic powder N is collected so as to follow the movement of the magnetic unit M2 when the magnetic unit M2 passes the bottom portion TB of the container T.

Figure 9D:
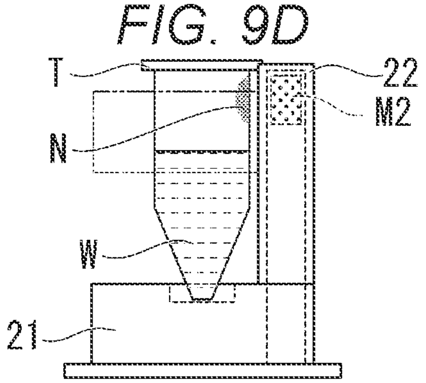
FIG. 9D is a diagram showing the purification method according to the second embodiment.

FIG. 9D shows a state in which the support rod 41 is inserted to an upper end of the back plate 22. The magnetic powder N collected in FIG. 9C follows the movement of the magnetic unit M2 and passes through the liquid surface. Accordingly, it is possible to suction or collect only the liquid W.

When a permanent magnet is used as the magnetic unit M2, there is no need to supply a magnetic field or a current from the outside. Therefore, a magnetic force is generated, and separation of the liquid W and the magnetic particles N starts simply by inserting the magnetic unit M2 from below the insertion hole 21*a*.

In the separation step of the present embodiment, when a magnetic force is generated, the force $F_{mag}$ generated in the magnetic particle, which is obtained by the above-mentioned equation (1), is set to a predetermined value or more, as in the first embodiment. However, unlike the first embodiment, the magnetic powder does not aggregate at the bottom portion of the container in the present embodiment, and therefore, the suction of the magnetic powder by the tip is not a big problem. Therefore, even when the force $F_{mag}$ generated in the magnetic particles is smaller than that in the first embodiment, separation accuracy and liquid collection accuracy can be ensured. Specifically, in the separation step of the present embodiment, a magnetic field gradient is applied such that the force $F_{mag}$ generated in the magnetic particles is 15 pN or more.

By the above-mentioned steps, the magnetic powder N can be separated from the test liquid L filled in the container T.

With the purification apparatus and the purification method according to the present embodiment described above, the liquid and the magnetic particles can be easily separated from each other simply by relatively moving (vertically moving) the container and the magnetic unit. Further, by adjusting, to an appropriate range, the force $F_{mag}$ generated in the magnetic particles when applying a magnetic field, needle-like formation of the magnetic powder can be prevented, the amount of liquid held by the magnetic powder can be greatly reduced, and the amount of liquid carried to the next step can be greatly reduced.

Third Embodiment

Hereinafter, a purification apparatus according to a third embodiment of the present disclosure will be described.

Figure 10:
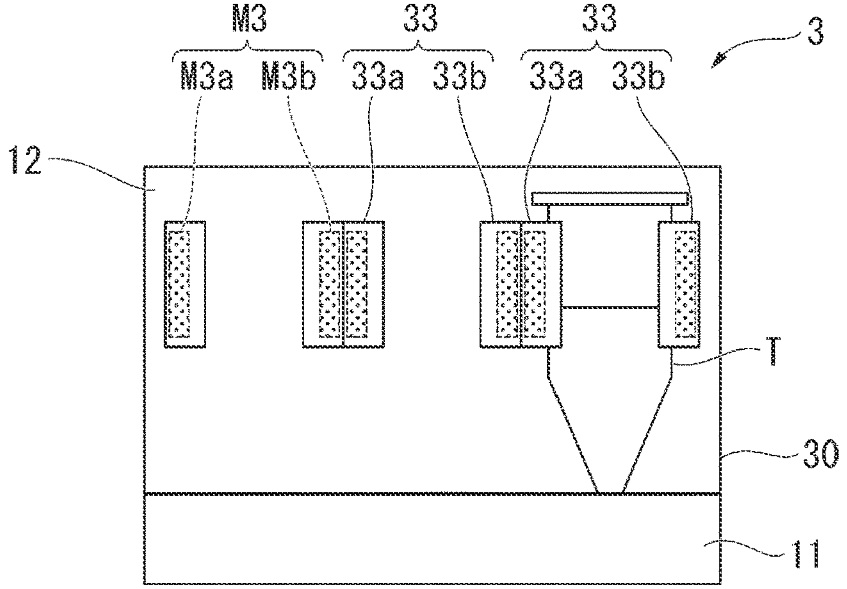
FIG. 10 is a schematic front view showing a purification apparatus according to a third embodiment.
Figure 11:
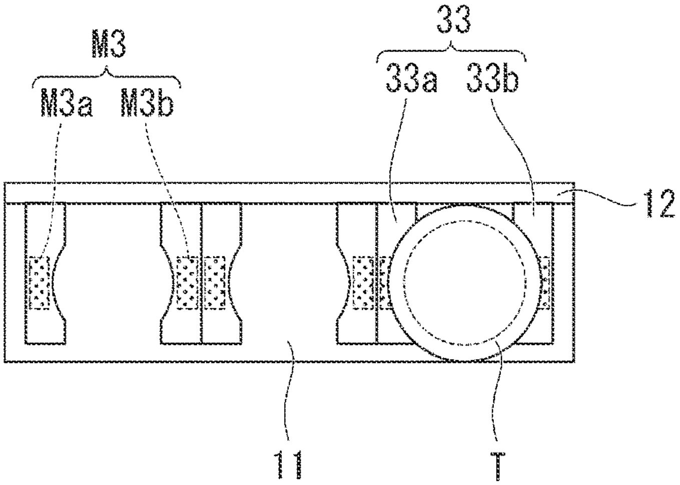
FIG. 11 is a schematic top view showing the purification apparatus according to the third embodiment.

FIG. 10 is a schematic front view showing a purification apparatus 3 according to the third embodiment. FIG. 11 is a schematic top view showing the purification apparatus 3 according to the third embodiment.

In the following drawings, the scale of dimensions may be different depending on components to make it easier to see each component. In the drawings used in the present embodiment, the same components as those in the drawings used in the first embodiment are denoted by the same reference numerals, and the description thereof is omitted.

As in the first embodiment, the purification apparatus 3 according to the present embodiment is an apparatus that purifies, using the magnetic separation method, a target substance from a suspension filled in a container. Specifically, as shown in FIGS. 10 and 11, the purification apparatus 3 includes a holding unit 30 for holding the container T, and a magnetic unit M3.

The holding unit 30 includes the bottom plate 11 for supporting the bottom portion of the container T to be mounted, a support portion 33 including a pair of support members 33*a* and 33*b* for supporting the body portion of the container T to be mounted from both side surfaces, and the back plate 12 vertically erected from the bottom plate 11. With such a configuration, the container T is held as shown in FIG. 10.

The bottom plate 11 of the holding unit 30 may be provided with a fixing recess as in the first embodiment.

The support portion 33 of the present embodiment is provided to extend in the horizontal direction from the upper portion of the back plate 12. The support portion 33 includes the pair of support members 33*a* and 33*b* such that the body portion TF of the container T to be mounted can be supported from both side surfaces. Shapes of inner surfaces of the pair of support members 33*a* and 33*b* facing each other may correspond to the shape of the container T to be mounted.

As shown in FIGS. 10 and 11, the magnetic unit M3 of the present embodiment is provided on each of the pair of support members 33*a* and 33*b*. That is, the magnetic unit M3 of the present embodiment includes a pair of magnetic units M3*a* and M3*b* provided to sandwich the body portion TF of the container T from both side surfaces. Therefore, in the present embodiment, the mechanism is that the magnetic powder can be easily separated from the test liquid and the magnetic powder can be easily exposed on the liquid surface simply by mounting the container T on the holding unit 20. The pair of magnetic units M3 may be arranged between the container T and each of the support members 33*a* and 33*b*, in addition to the inside of the pair of support members 33*a* and 33*b*. That is, as shown in FIGS. 10 and 11, the magnetic units M3 do not necessarily have to be integrated with the support members 33*a* and 33*b*, and may be provided on both side surfaces of the container T as members separate from the holding unit 30.

In the present embodiment, the magnetic unit M3 and the container T can relatively move (vertically move) along the longitudinal direction of the container T. Therefore, by vertically moving either the holding unit 30 or the container T when performing actual purification, the magnetic powder can move following this movement.

As described above, in the present embodiment, by relatively moving the magnetic unit M3 and the container T, the liquid in the container T and the magnetic particles contained in the liquid can be separated from each other and/or the magnetic particles can be collected to the outside of the liquid.

As in the first embodiment, the magnetic unit M3 is preferably a permanent magnet or an electromagnet. The pair of magnetic units M3*a* and M3*b* constituting the magnetic unit M3 have the same polarity. When magnetic units having different polarities are used, the magnetic powder is in the form of being aggregated from the magnetic unit M3*a* to the magnetic unit M3*b* along the magnetic field line. In such an aggregation form, the amount of the liquid held by the aggregate is very large, and the liquid may be carried to the next step. Therefore, in the present embodiment, the pair of magnetic units M3*a* and M3*b* have the same polarity.

In the present embodiment, a vibration generator for mixing and stirring the liquid and the magnetic particles in the container may also be provided below the holding unit 30.

As in the first embodiment, the purification apparatus 3 according to the present embodiment can be used as an apparatus for purifying and separating nucleic acids, antibodies, extracellular vesicles, cells, proteins, peptides, bacteria, viruses, algae, low molecular weight compounds, heavy metals, and the like. In particular, a magnetic stand that uses a magnetic powder as a carrier to separate biological components such as nucleic acids, proteins, and cells from liquids and further purify the biological components can be preferably used.

Next, a purification method using the purification apparatus 3 according to the third embodiment will be described.

The purification method according to the present embodiment includes: a mounting step of supporting, by a support portion, a body portion of a container, in which a test liquid containing a liquid and magnetic particles of an amorphous metal is contained, and mounting the container on a holding unit in a state in which the container is standing; and a separation step of separating the liquid and the magnetic particles from each other and/or collecting the magnetic particles by driving a magnetic unit to generate a magnetic force in a horizontal direction and relatively moving (vertically moving) the container and the magnetic unit along a longitudinal direction of the container.

In the mounting step, as in the first embodiment, first, the container T, in which a test liquid containing a liquid and magnetic particles of an amorphous metal is contained, is prepared, and then, the container T is mounted on the holding unit 30 (see FIG. 10). The type and performance (magnetic properties and the like) of the magnetic particles to be used may be the same as those in the first embodiment.

After the mounting step, the separation step of separating the liquid and the magnetic particles from each other is performed.

Specifically, the container T and the magnetic unit M3 are relatively moved (vertically moved) along the longitudinal direction of the container T in a state in which the magnetic unit M3 is driven to generate a magnetic force in the horizontal direction. Accordingly, the magnetic particles can be collected above the liquid surface.

When a permanent magnet is used as the magnetic unit M3, there is no need to supply a magnetic field or a current from the outside, and therefore, in the mounting step, the liquid and the magnetic particles can be separated from each other simply by mounting the container T on the holding unit 30. That is, when a permanent magnet is used as the magnetic unit M3, the mounting step and the separation step can be carried out at the same time.

In the separation step of the present embodiment, when a magnetic force is generated, the force $F_{mag}$ generated in the magnetic particles N, which is obtained by the above-mentioned equation (1), is set to a predetermined value or more, as in the first embodiment. However, as in the second embodiment, aggregation of the magnetic powder at the bottom portion of the container as in the first embodiment does not occur in the present embodiment. Therefore, the suction of the magnetic powder by the tip is not a big problem. Therefore, even when the force $F_{mag}$ generated in the magnetic particles is smaller than that in the first embodiment, the separation accuracy and the liquid collection accuracy can be ensured. Specifically, in the separation step of the present embodiment, a magnetic field gradient is applied such that the force $F_{mag}$ generated in the magnetic particles is 15 pN or more.

By the above-mentioned steps, the magnetic powder can be separated from the test liquid filled in the container.

With the purification apparatus and the purification method according to the third embodiment described above, the liquid and the magnetic particles can be easily separated from each other simply by relatively moving (vertically moving) the container and the magnetic unit. Further, by adjusting, to an appropriate range, the force $F_{mag}$ generated in the magnetic particles when applying a magnetic field, needle-like formation of the magnetic powder can be prevented, the amount of liquid held by the magnetic powder can be greatly reduced, and the amount of liquid carried to the next step can be greatly reduced.

EXAMPLES

Hereinafter, the present disclosure will be described in more detail with reference to Examples, but the present disclosure is not limited to these Examples.

Example 1-1

The purification apparatus 1 shown in FIGS. 1 and 2 was used to separate the magnetic particles and collect the liquid, and the residual liquid amount after the liquid collection was evaluated. A neodymium magnet was used as the magnetic unit.

First, 10 $mm^3$ of amorphous metal particles (average diameter: 3 μm) was added to a 1.5 mL microtube, and a total weight including the microtube was measured. Then, 200 μL of 70% ethanol was further added, and was mixed and stirred with a vortex mixer. Thereafter, the microtube was inserted into the purification apparatus 1 shown in FIGS. 1 and 2, and allowed to stand for 5 seconds to perform magnetic separation.

After the magnetic separation, a tip of a micropipette was inserted into the microtube until the tip was in contact with a bottom surface of the microtube, and 70% ethanol was suctioned and collected. The weight of the microtube after the ethanol collection was measured and was subtracted from the weight measured before the magnetic separation to calculate the weight of 70% ethanol remaining in the tube (residual liquid amount).

Comparative Example 1

The test was performed in the same manner as in Example 1-1. However, a magnetic stand "Magical Trapper" manufactured by Toyobo Co., Ltd. was used as the purification apparatus.

Comparative Example 2

The test was performed in the same manner as in Example 1-1. However, a ferrite magnetic bead (manufactured by Toyobo Co., Ltd.) was used as the magnetic powder, and a magnetic stand "Magical Trapper" manufactured by Toyobo Co., Ltd. was used as the purification apparatus.

Results of Example 1-1 and Comparative Examples 1 and 2 are shown in Table 1.

TABLE 1

| | Residual liquid amount*1 (mg) |
|---|---|
| Example 1-1 | 19 |
| Comparative Example 1 | 137 |
| Comparative Example 2 | 29 |

*1weight (mg) of ethanol remaining in tube

From the results shown in Table 1, it is confirmed that, by using the purification apparatus according to the present disclosure, the residual amount of ethanol (that is, the amount to be brought into the next step) can be reduced even when an amorphous metal having a needle-like structure is used as the magnetic powder.

The residual amount of ethanol is smaller than that in Comparative Example 2 (when a general ferrite magnetic bead and a magnetic stand in the related art are used). Accordingly, it can be said that the influence on the next step (for example, enzyme reaction in a PCR test) can be minimized.

The present disclosure is not limited to the field of nucleic acid analysis, and can be similarly utilized for purification and separation of antibodies, extracellular vesicles, cells, proteins, peptides, bacteria, viruses, algae, low molecular weight compounds, heavy metals, and the like.

Example 1-2

Next, when the purification apparatus 1 shown in FIGS. 1 and 2 was used and the magnetic field line pattern shown in FIG. 4A was adopted, various magnetic field gradients were applied to the magnetic powder, and the force $F_{mag}$ generated in the magnetic powder was obtained according to the above-mentioned equation (1). As the magnetic powder used, amorphous metal particles having an average particle diameter of 10 μm, 3 μm, and 1 μm were prepared and tested.

Thereafter, whether the magnetic powder was suctioned when a supernatant was suctioned by a pipette was examined. The results are shown in Tables 2 and 3.

In Table 3, when suction is performed by the pipette, the case where the magnetic powder is suctioned is indicated by "Poor", and the case where the magnetic powder is not suctioned is indicated by "Good". From this result, it is found that the case where the force $F_{mag}$ generated in the magnetic powder is 500 pN or more is optimal.

TABLE 2

| | | Force [pN] generated in magnetic bead Average particle diameter [μm] | | |
|---|---|---|---|---|
| | | 10 | 3 | 1 |
| Magnetic field gradient [T/m] | 237 | 124875 | 3372 | 125 |
| | 103 | 54520 | 1472 | 55 |
| | 59 | 31386 | 847 | 31 |
| | 38 | 20214 | 546 | 20 |
| | 26 | 13902 | 375 | 14 |
| | 19 | 9984 | 270 | 10 |
| | 14 | 7412 | 200 | 7 |
| | 11 | 5654 | 153 | 6 |
| | 8 | 4404 | 119 | 4 |
| | 7 | 3494 | 94 | 3 |
| | 5 | 2821 | 76 | 3 |
| | 4 | 2309 | 62 | 2 |

TABLE 3

| | | Determination Average particle diameter [μm] | | |
|---|---|---|---|---|
| | | 10 | 3 | 1 |
| Magnetic field gradient [T/m] | 237 | Good | Good | Poor |
| | 103 | Good | Good | Poor |
| | 59 | Good | Good | Poor |
| | 38 | Good | Good | Poor |
| | 26 | Good | Poor | Poor |
| | 19 | Good | Poor | Poor |
| | 14 | Good | Poor | Poor |
| | 11 | Good | Poor | Poor |
| | 8 | Good | Poor | Poor |
| | 7 | Good | Poor | Poor |
| | 5 | Good | Poor | Poor |
| | 4 | Good | Poor | Poor |

Example 2

Using the purification apparatus 2 shown in FIGS. 6 to 9, the force $F_{mag}$ generated in the magnetic powder was obtained in the same manner as in Example 1-2.

As in Example 1-1, after the magnetic separation, the tip of the micropipette was inserted into the microtube until the tip was in contact with the bottom surface of the microtube, and 70% ethanol was suctioned and collected. The weight of the microtube after the ethanol collection was measured and was subtracted from the weight measured before the magnetic separation to calculate the weight of 70% ethanol remaining in the tube (residual liquid amount).

The results are shown in Tables 4 and 5.

In Table 4, the case where the magnetic bead does not follow the magnet is indicated by "Poor", the case where the residual liquid amount is 40 μL or more is indicated by "Fair", and the case where the residual liquid amount is less than 40 μL is indicated by "Good".

When the magnetic field gradient was small, the magnetic bead did not follow the movement of the magnet and could not pass through the liquid surface. In contrast, since the magnetic powder exhibited a needle-like structure when the magnetic field gradient was too large, the magnetic powder contained a liquid, and as a result, the residual liquid amount after collection increased. From Examples, it is shown that a range of 15 pN or more of the force generated in the magnetic powder is suitable from the viewpoint of movement-following of the magnetic bead, and a range of 15 pN to 5500 pN is optimal from the viewpoint of reduction of the residual liquid amount.

TABLE 4

| | | Force [pN] generated in magnetic bead Average particle diameter [μm] | | |
|---|---|---|---|---|
| | | 10 | 3 | 1 |
| Magnetic field gradient [T/m] | 237 | 124875 | 3372 | 125 |
| | 103 | 54520 | 1472 | 55 |
| | 59 | 31386 | 847 | 31 |
| | 38 | 20214 | 546 | 20 |
| | 26 | 13902 | 375 | 14 |
| | 19 | 9984 | 270 | 10 |
| | 14 | 7412 | 200 | 7 |
| | 11 | 5654 | 153 | 6 |
| | 8 | 4404 | 119 | 4 |
| | 7 | 3494 | 94 | 3 |
| | 5 | 2821 | 76 | 3 |
| | 4 | 2309 | 62 | 2 |

TABLE 5

| | | Determination Average particle diameter [μm] | | |
|---|---|---|---|---|
| | | 10 | 3 | 1 |
| Magnetic field gradient [T/m] | 237 | Fair | Good | Good |
| | 103 | Fair | Good | Good |
| | 59 | Fair | Good | Good |
| | 38 | Fair | Good | Good |
| | 26 | Fair | Good | Poor |
| | 19 | Fair | Good | Poor |
| | 14 | Fair | Good | Poor |
| | 11 | Fair | Good | Poor |
| | 8 | Good | Good | Poor |
| | 7 | Good | Good | Poor |
| | 5 | Good | Good | Poor |
| | 4 | Good | Good | Poor |

Example 3 and Comparative Examples 3 and 4

Figure 12A:
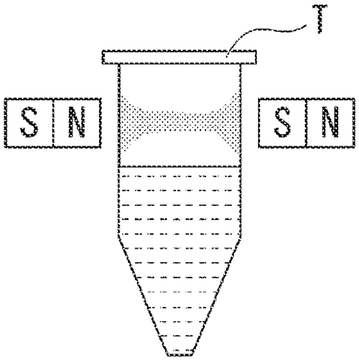
FIG. 12A is a diagram illustrating Comparative Example 3.
Figure 12B:
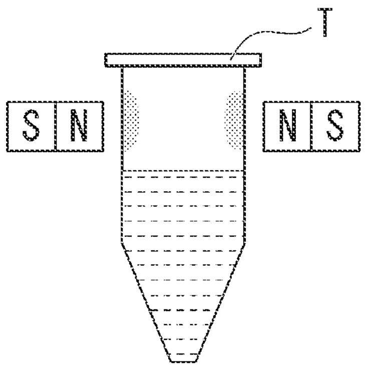
FIG. 12B is a diagram illustrating Example 3.
Figure 12C:
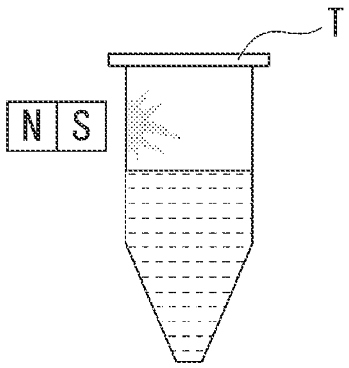
FIG. 12C is a diagram illustrating Comparative Example 4.

FIGS. 12A to 12C show examples in which the magnetic powder is collected by variously changing the polarities of the pair of magnets facing each other using the purification apparatus 3 shown in FIGS. 10 and 11.

FIG. 12A shows a pattern in which different poles face each other (Comparative Example 3). In this case, the magnetic powder is collected along the magnetic field line. Therefore, since the magnetic powder is accumulated as shown in FIG. 12A, the amount of liquid carried increases. FIG. 12C shows a pattern using a magnet of 5654 pN (Comparative Example 4). Also in this case, the magnetic powder is collected in a needle shape, so that the residual liquid amount increases.

In contrast, FIG. 12B shows a pattern in which the same poles face each other (Example 3). In this case, the magnetic powder does not have a needle-like structure, and a surface area of the aggregate of the magnetic powder can be reduced. Therefore, the amount of the liquid held by the magnetic powder can be reduced to the minimum, and the residual liquid can be reduced to the minimum. Another advantage in the case of FIG. 12B is that the residual liquid amount can be less than 40 μL even under the condition of "5654 pN", which is unsuitable in FIG. 12C. Since a strong magnetic flux density can be used, the magnetic powder can be collected more quickly and firmly, which is effective in improving the reproducibility of various purification steps such as nucleic acid purification and shortening the operation time.

Next, as in Example 1-2, the optimum conditions of the force $F_{mag}$ generated in the magnetic powder in FIG. 12B were examined.

The results are shown in Tables 6 and 7.

In Table 6, the case where the magnetic powder does not follow the magnet is indicated by "Poor", and the case where the residual liquid amount is less than 40 μL is indicated by "Good".

From the results in Tables 6 and 7, it is shown that the case where the force generated in the magnetic powder is 15 pN or more is optimal. Unlike Example 2, the magnetic field lines emitted from two magnets repel each other even when the force generated in the magnetic powder is 5654 pN or more, and therefore, the magnetic field lines can be prevented from extending radially, and the needle-like structure is not strongly generated.

TABLE 6

| | | Force [pN] generated in magnetic bead Average particle diameter [μm] | | |
|---|---|---|---|---|
| | | 10 | 3 | 1 |
| Magnetic field gradient [T/m] | 237 | 124875 | 3372 | 125 |
| | 103 | 54520 | 1472 | 55 |
| | 59 | 31386 | 847 | 31 |
| | 38 | 20214 | 546 | 20 |
| | 26 | 13902 | 375 | 14 |
| | 19 | 9984 | 270 | 10 |
| | 14 | 7412 | 200 | 7 |
| | 11 | 5654 | 153 | 6 |
| | 8 | 4404 | 119 | 4 |
| | 7 | 3494 | 94 | 3 |
| | 5 | 2821 | 76 | 3 |
| | 4 | 2309 | 62 | 2 |

TABLE 7

| | | Determination Average particle diameter [μm] | | |
|---|---|---|---|---|
| | | 10 | 3 | 1 |
| Magnetic field gradient [T/m] | 237 | Good | Good | Good |
| | 103 | Good | Good | Good |
| | 59 | Good | Good | Good |
| | 38 | Good | Good | Good |
| | 26 | Good | Good | Poor |
| | 19 | Good | Good | Poor |
| | 14 | Good | Good | Poor |
| | 11 | Good | Good | Poor |
| | 8 | Good | Good | Poor |
| | 7 | Good | Good | Poor |
| | 5 | Good | Good | Poor |
| | 4 | Good | Good | Poor |

What is claimed is:

1. A purification apparatus, comprising:
- a holding unit including a bottom plate to support a bottom portion of a container, wherein the container is mounted on the holding unit;
- a fixing recess on an upper surface of the bottom plate to fix the bottom portion of the container to the upper surface of the bottom plate, wherein the fixing recess has a concave shape; and
- a magnetic unit being embedded below the fixing recess or being provided so as to be exposed from the fixing recess wherein
  - the magnetic unit is configured to generate a magnetic field line having a direction that is oriented in a longitudinal direction of the container, and
  - the magnetic unit fixes magnetic particles of an amorphous metal to an inner bottom portion of the container so as to one of separate a liquid in the container from the magnetic particles contained in the liquid or collect the liquid while leaving the magnetic particles in the container.

2. The purification apparatus according to claim 1, wherein the magnetic unit includes one of a permanent magnet or an electromagnet.

3. The purification apparatus according to claim 1, wherein the magnetic unit is detachable from the holding unit.

4. The purification apparatus according to claim 1, wherein the container is selected from the group consisting of a microtube, a test tube, and a centrifuge tube.

5. The purification apparatus according to claim 1, further comprising a vibration generator configured to mix and stir the liquid and the magnetic particles, wherein the vibration generator is below the holding unit.

6. The purification apparatus according to claim 1, wherein the purification apparatus is a magnetic stand for extraction and separation of a biological substance using the magnetic particles.

7. The purification apparatus according to claim 5, wherein the holding unit is fixed to the vibration generator by a magnetic force of the magnetic unit.

* * * * *